United States Patent
Chen

(10) Patent No.: US 12,508,959 B2
(45) Date of Patent: Dec. 30, 2025

(54) CHILD SAFETY SEAT

(71) Applicant: BAMBINO PREZIOSO SWITZERLAND AG, Steinhausen (CH)

(72) Inventor: Hongbo Chen, Guangdong (CN)

(73) Assignee: Bambino Prezioso Switzerland AG, Steinhausen (CH)

( * ) Notice: Subject to any disclaimer, the term of this patent is extended or adjusted under 35 U.S.C. 154(b) by 283 days.

(21) Appl. No.: 18/014,860

(22) PCT Filed: Jun. 17, 2021

(86) PCT No.: PCT/CN2021/100661
§ 371 (c)(1),
(2) Date: Jan. 6, 2023

(87) PCT Pub. No.: WO2022/007609
PCT Pub. Date: Jan. 13, 2022

(65) Prior Publication Data
US 2023/0286423 A1  Sep. 14, 2023

(30) Foreign Application Priority Data
Jul. 6, 2020  (CN) .......................... 202010643388.2

(51) Int. Cl.
*B60N 2/28* (2006.01)
*B62B 9/14* (2006.01)
(Continued)

(52) U.S. Cl.
CPC ......... *B60N 2/2839* (2013.01); *B60N 2/2884* (2013.01); *B62B 9/14* (2013.01); *F16B 21/16* (2013.01); *H01R 13/5213* (2013.01)

(58) Field of Classification Search
CPC ...... B60N 2/2839; B60N 2/2887; B62B 9/14; Y10T 403/59; Y10T 403/591; Y10T 403/599; F16B 21/16; H01R 13/5213
See application file for complete search history.

(56) References Cited

U.S. PATENT DOCUMENTS

| 4,679,806 A | * | 7/1987 | Gingline ................ B62B 9/245 |
| | | | 280/47.38 |
| 7,401,834 B2 | | 7/2008 | Browne |
| 9,119,508 B2 | | 9/2015 | Reed |

FOREIGN PATENT DOCUMENTS

| CN | 102343846 A | 2/2012 |
| CN | 103241148 A | 8/2013 |

(Continued)

OTHER PUBLICATIONS

International Search Report for PCT/CN2021/100661 dated Sep. 27, 2021.

(Continued)

*Primary Examiner* — Syed A Islam
(74) *Attorney, Agent, or Firm* — Volpe Koenig

(57) ABSTRACT

A child safety seat, comprising a seat body, a connecting member and a sealing mechanism; the seat body is provided with a mounting opening for insertion of a fitting, the connecting member is provided in the mounting opening and is fixedly connected to the seat body; the sealing mechanism comprises a sealing member, the sealing member is slidably provided in the mounting opening and is used for sealing the mounting opening, the sealing member is provided with an accommodating groove which has an opening facing outwards and is used for accommodating the connecting member, and the sealing member is pushed by means of the fitting to enable the connecting member to be detached from the (Continued)

accommodating groove, such that the fitting can be connected to the connecting member.

11 Claims, 12 Drawing Sheets

(51) Int. Cl.
*F16B 21/16* (2006.01)
*H01R 13/52* (2006.01)

(56) References Cited

FOREIGN PATENT DOCUMENTS

| CN | 103407388 A | 11/2013 |
| CN | 203651525 U | 6/2014 |
| CN | 104044488 A | 9/2014 |
| CN | 105015376 A | 11/2015 |
| CN | 110126773 A | 8/2019 |
| CN | 110356297 A | 10/2019 |
| JP | 2000071932 A | 3/2000 |
| JP | 2001246973 A | 9/2001 |
| JP | 2002240603 A | 8/2002 |
| JP | 2015508723 A | 3/2015 |
| WO | 2020015596 A1 | 1/2020 |

OTHER PUBLICATIONS

Written Opinion for PCT/CN2021/100661 dated Sep. 27, 2021.
Office Action for Taiwanese Patent Application No. 110124675 dated Apr. 20, 2022.
"Notice of Allowance Issued in Corresponding Chinese Patent Application No. 202010643388.2", Mailed Date: Jan. 10, 2025, 4 pages.
Office Action issued in corresponding Chinese Application No. 202010643388.2 dated Nov. 30, 2023.
Office Action issued in corresponding Japanese Application No. 2023-500087 dated Nov. 28, 2023.
Japan Patent Office. Notice of Allowance for corresponding application JP 2024-162088, mailed Nov. 11, 2025. 5 pages.

* cited by examiner

CHILD SAFETY SEAT

CROSS-REFERENCE TO RELATED APPLICATIONS

This application is a 371 U.S. National Phase of International Application No. PCT/CN2021/100661, filed on Jun. 17, 2021, which is based on and claims priority to the Chinese patent application No. 202010643388.2, filed on Jul. 6, 2020, the entire contents of which constitute a part of this application and are incorporated herein by reference.

TECHNICAL FIELD

The present disclosure relates to the field of products for children, and in particular to a child safety seat.

BACKGROUND

A child safety seat is a seat specially designed for children, and is assembled inside a vehicle for a child to sit, so that the child can be restrained to ensure the safety of the child during movement of the vehicle. The child safety seats on market include two types of safety systems, i.e., a five-point safety belt type and a front shield type. The front shield type child safety seat can effectively protect cervical spine of the child. After the child sits on a seat body, a front shield is fixedly connected to the seat body; however, the front shield does not secure the child completely onto the seat body, so that the child's body can be bendable to some extent and be cushioned by the front shield in case of collision or sudden braking, so as to reduce impact on the cervical spine of the child.

The seat body of the existing front shield type child safety seat is generally provided with a socket for the front shield to be inserted and installed. The socket is in an opened form, which is easy to squeeze dust and affects the cleanness of the child safety seat. Moreover, as the socket is opened, there is a potential safety risk that hand(s) of the child may be accidentally inserted into the socket when the child sits on the seat body.

SUMMARY

The present disclosure provides a child safety seat, which includes a seat body, a connecting member and a sealing mechanism. The seat body is provided with a mounting opening for insertion of a fitting. The connecting member is provided in the mounting opening and fixedly connected to the seat body. The sealing mechanism includes a sealing member that is slidably provided in the mounting opening for sealing the mounting opening, and the sealing member is provided with an accommodating groove having an opening faced outwards and accommodating the connecting member. The sealing member is pushed by means of the fitting to enable the connecting member to be disengaged from the accommodating groove, such that the fitting is connected to the connecting member.

The present disclosure provides a child safety seat including a seat body and a sealing mechanism. The seat body is provided with a mounting opening for insertion of a fitting, the sealing mechanism includes a sealing member that is slidably arranged in the mounting opening for sealing the mounting opening, and the sealing member is pushed by means of the fitting to be connected to the seat body.

Figure 1:
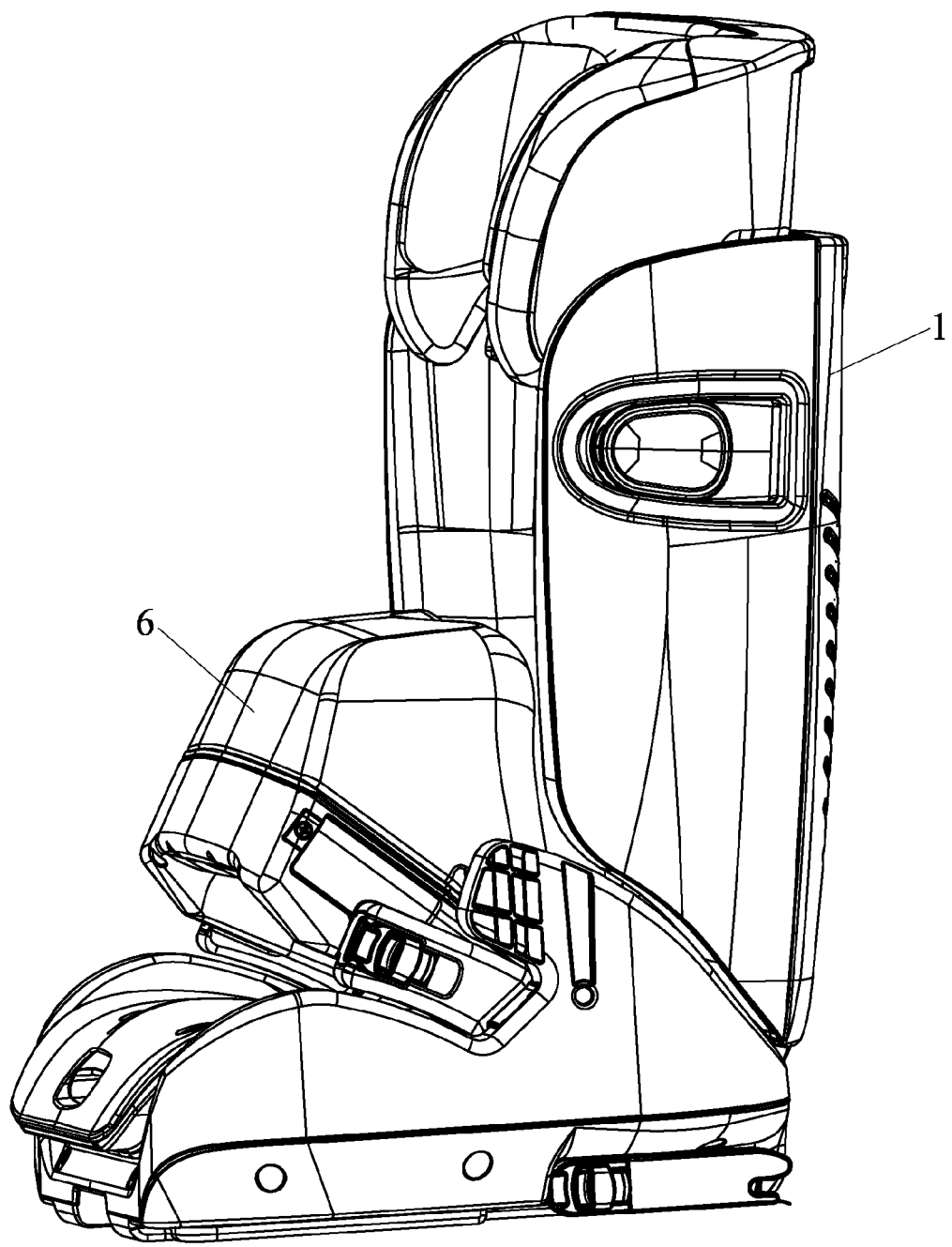
FIG. 1 is a schematic perspective view of a child safety seat according to a first embodiment of the present disclosure.
Figure 2:
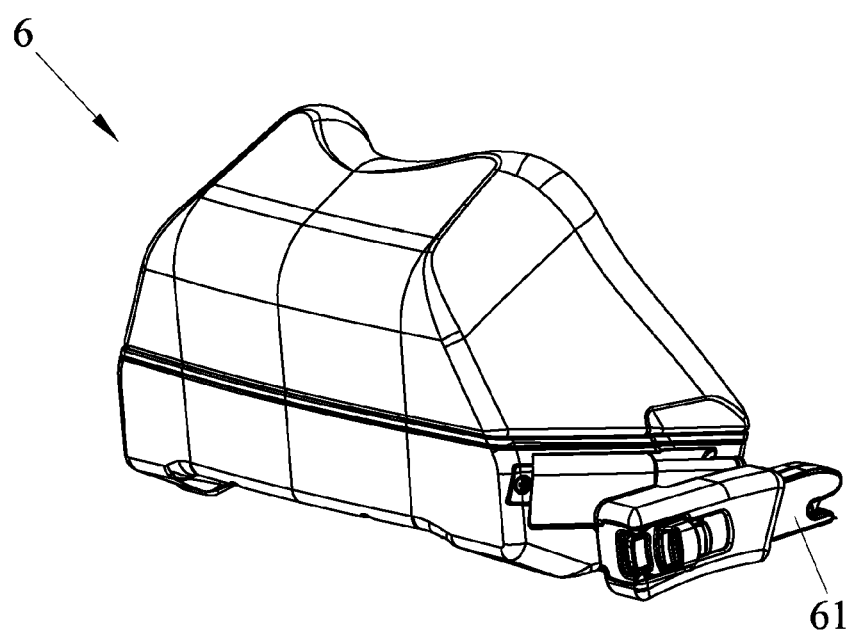
FIG. 2 is a schematic view of a fitting of the child safety seat according to the first embodiment of the present disclosure.
Figure 3:
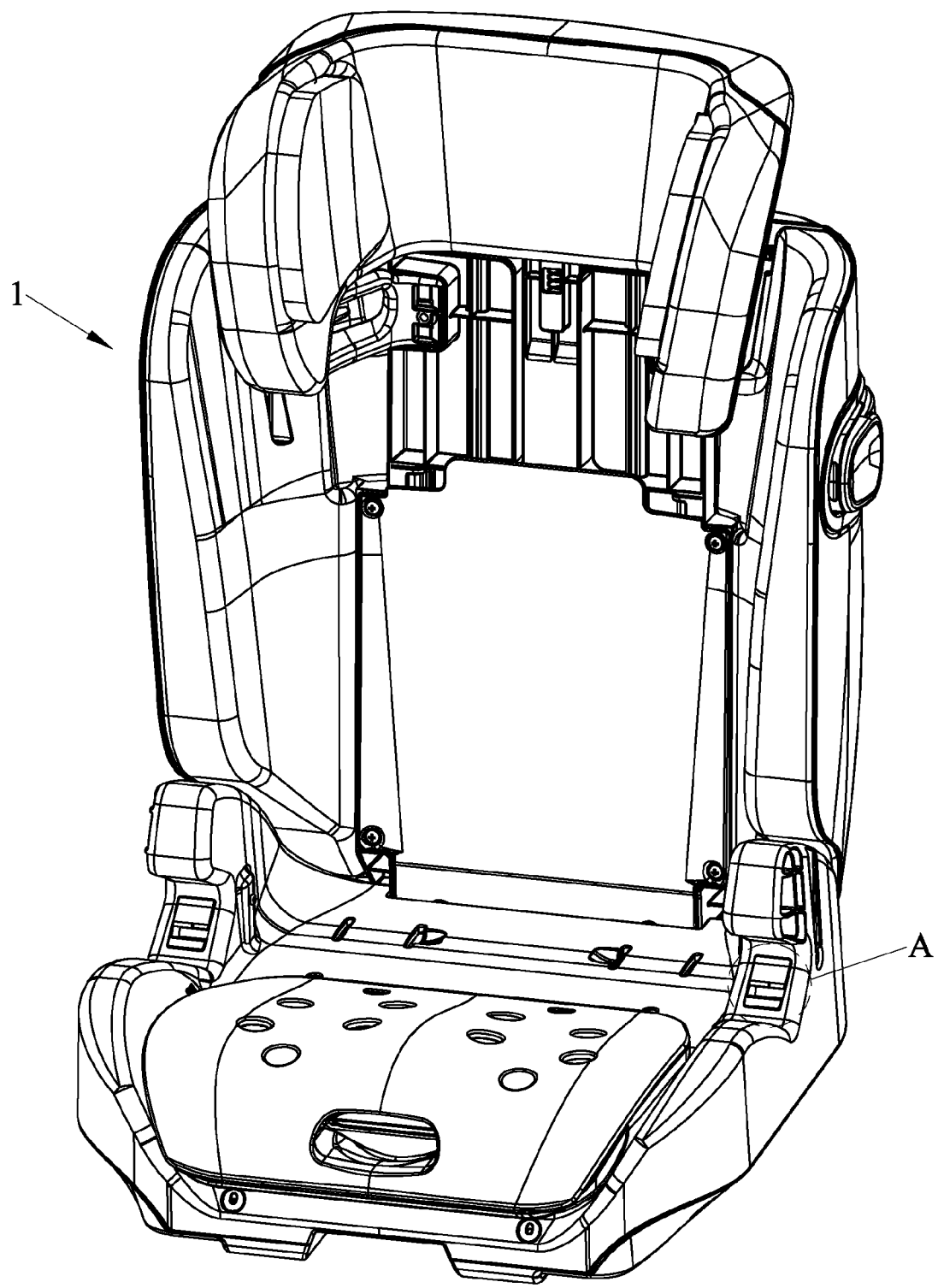
FIG. 3 is a schematic view of a seat body of the child safety seat according to the first embodiment of the present disclosure.
Figure 4:
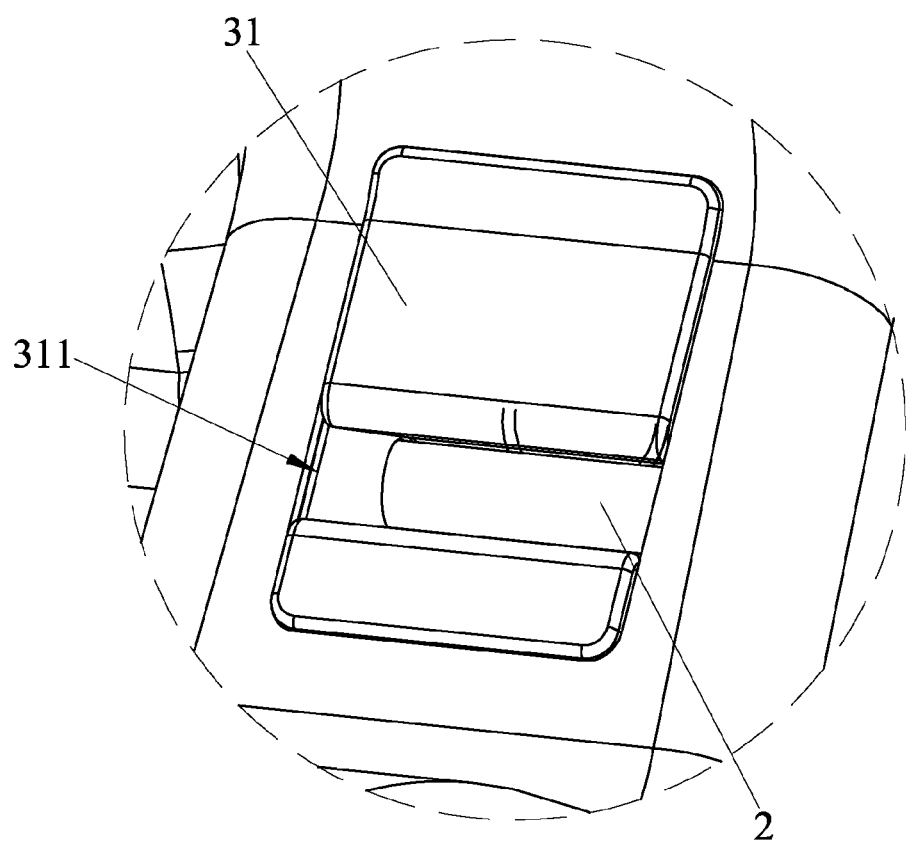
FIG. 4 is an enlarged view of A in FIG. 3.

Reference Numbers are Listed as Follows:
100 Child Safety Seat
1 Seat Body
11 Mounting Opening
12 Fixing Seat
121 Sliding Groove
122 Stopper
2 Connecting Member
3 Sealing Mechanism
31 Sealing Member
311 Accommodating Groove
312 Receiving Groove
313 Limiting Groove
314 Sealing Body
315 Limiting Part
32 First Elastic Reset Member
4 Limiting Member
5 Rolling Member
6 Fitting
61 Engaging Part
62 Housing
621 First Perforation
622 Second Perforation
623 Third Perforation
63 First Engaging Member
64 Second Engaging Member
65 Second Elastic Reset Member

DETAILED DESCRIPTION

The technical contents and the configuration features of the present disclosure are further explained in details in combination with the embodiments and the drawings.

First Embodiment

Referring to FIGS. 1 to 6, a child safety seat 100 of the present disclosure includes a seat body 1, a connecting member 2, and a sealing mechanism 3. The seat body 1 is provided with a mounting opening 11 for insertion of a fitting 6. The connecting member 2 is provided in the mounting opening 11 and is fixedly connected to the seat body 1. The sealing mechanism 3 includes a sealing member 31 which is slidably provided in the mounting opening 11 and serves to seal the mounting opening 11. The sealing member 31 is provided with an accommodating groove 311 which has an opening facing outwards and in which the connecting member 2 is accommodated. The sealing member 31 is pushed by means of the fitting 6 to insert the fitting 6 into the mounting opening 11, such that the connecting member 2 can be disengaged from the accommodating groove 311 and the fitting 6 can be connected to the connecting member 2, realizing installation of the fitting 6 onto the seat body 1. In this embodiment, the fitting 6 is a front shield, but the present disclosure is not limited thereto. Specifically, the fitting 6 is provided with an engaging part 61 that is insertable into the mounting opening 11 and is removably connected to the connecting member 2. When it is necessary to install the fitting 6, the sealing member 31 is pushed by the engaging part 61 of the fitting 6 to insert the engaging part 61 into the mounting opening 11, such that the engaging part 61 is connected to the connecting member 2. The connecting member 2 is a fixed crossbar, the engaging part 61 is an engaging hook, and the connecting member 2 and the engaging part 61 may be clamped together, such that the fitting 6 is installed on the seat body 1. The engaging part 61 may also be disengaged from the connecting member 2 and move out of the mounting opening 11, so as to disassemble the fitting 6. However, the configuration of the engaging part 61 and the connecting member 2 is not limited thereto. For example, the engaging part 61 and the connecting member 2 may be connected in a manner of a clamping block and a clamping hole.

Figure 5:
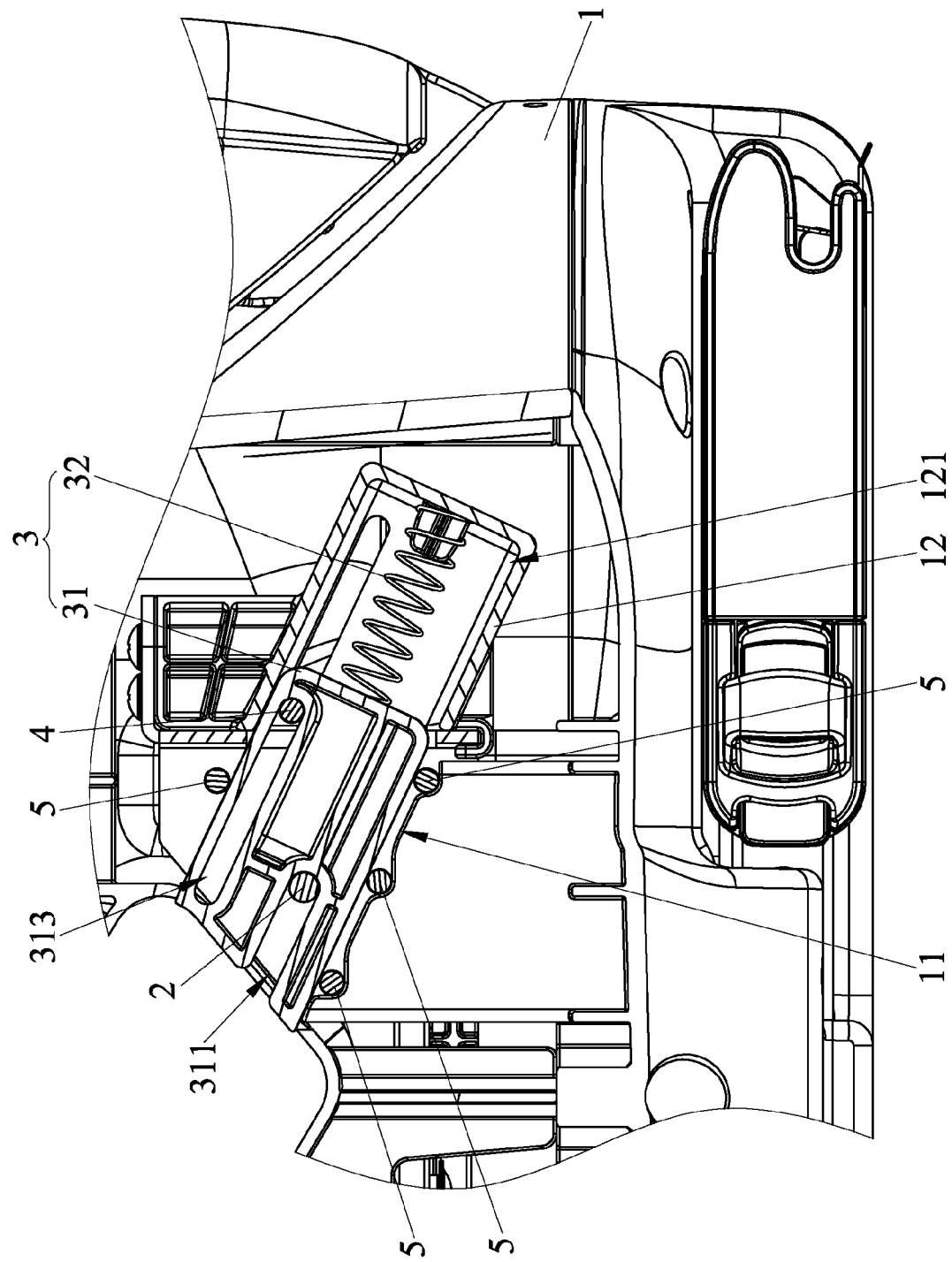
FIG. 5 is a schematic view of an internal structure of the seat body of the child safety seat according to the first embodiment of the present disclosure.
Figure 6:
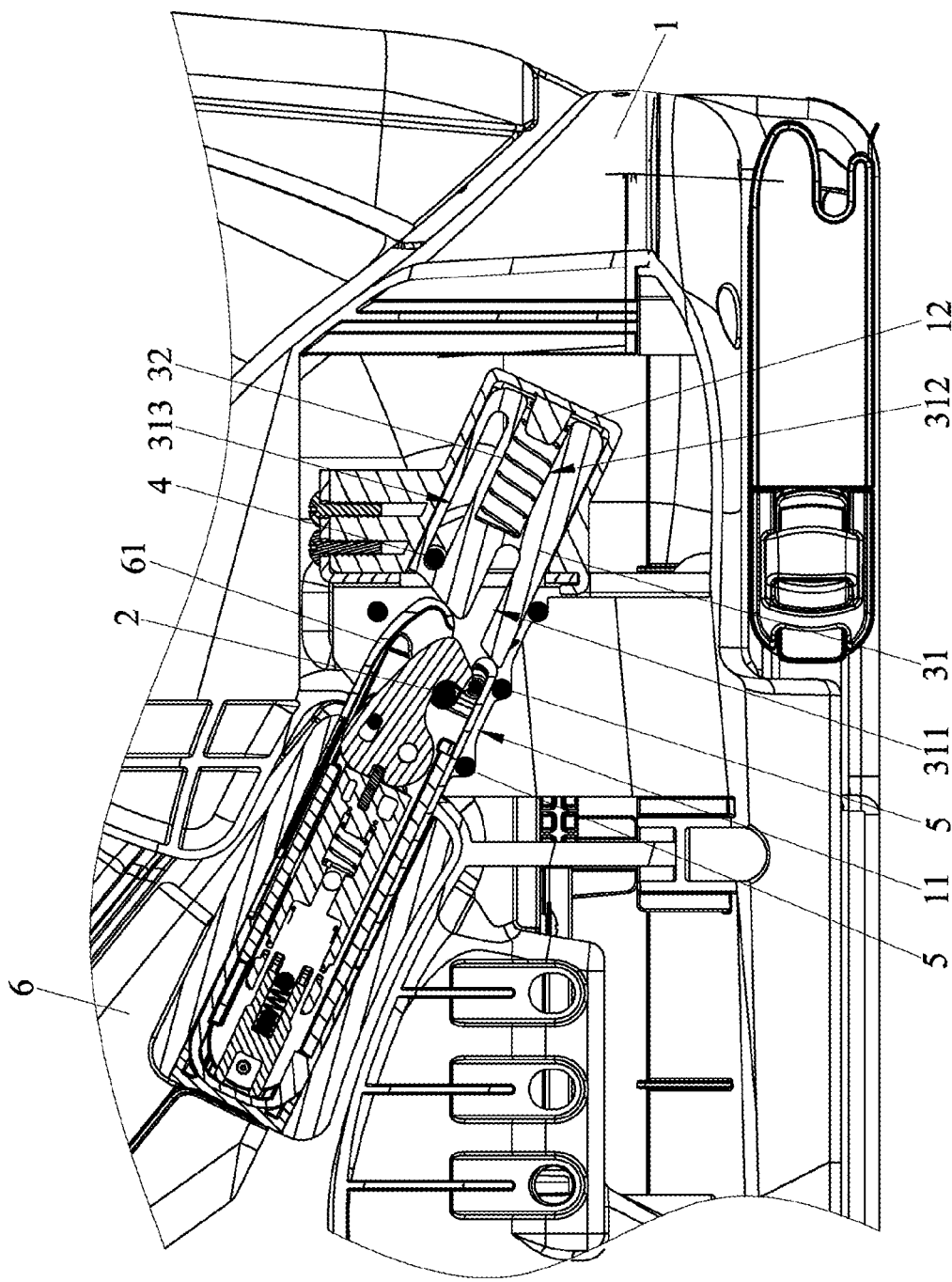
FIG. 6 is a schematic view of an internal structure of the child safety seat after being assembled according to the first embodiment of the present disclosure.

Referring to FIGS. 5 and 6, the sealing mechanism 3 further includes a first elastic reset member 32 for driving the sealing member 31, and the first elastic reset member 32 is arranged between the sealing member 31 and the seat body 1. When the fitting 6 pushes against the sealing member 31 to slide, the sealing member 31 compresses the first elastic reset member 32; and when the fitting 6 moves out of the mounting opening 11 and releases the sealing member 31, the sealing member 31 may slidably reset to an initial position under the action of an elastic recovery force of the first elastic reset member 32, and the accommodating groove 311 of the sealing member 31 may re-accommodate the connecting member 2 and seal the mounting opening 11. Specifically, the sealing member 31 is provided with a receiving groove 312. The first elastic reset member 32 has one end inserted into the receiving groove 312 and the other end connected to the seat body 1. Furthermore, the seat body 1 is provided with a fixing seat 12 in the mounting opening 11, the fixing seat 12 is provided with a sliding groove 121, and the sealing member 31 is slidable along the sliding groove 121; the other end of the first elastic reset member 32 is arranged in the sliding groove 121 and connected to the fixing seat 12, and the first elastic reset member 32 is positioned between the sealing member 31 and the fixing seat 12. When the fitting 6 pushes against the sealing member 31 to slide, the sealing member 31 is inserted into the sliding groove 121 and slidable along the sliding groove 121.

Further referring to FIGS. 5 and 6, the child safety seat 100 of the present disclosure further includes a limiting member 4 which is arranged in the mounting opening 11 and is fixedly connected to the seat body 1. The sealing member 31 is provided with a limiting groove 313, in which the limiting member 4 is inserted. When the fitting 6 pushes against the sealing member 31 to slide, the limiting member 4 slides relatively in the limiting groove 313, while the limiting groove 313 acts as limiting a sliding stroke of the sealing member 31. Furthermore, the child safety seat 100 of the present disclosure further includes a rolling member 5 that is pivotally connected to the seat body 1 and arranged between an inner wall of the mounting opening 11 and the sealing member 31. When the fitting 6 pushes against the sealing member 31, the sealing member 31 slides on the rolling member 5, the rolling member 5 may convert a sliding friction applied on the sealing member 31 into a rolling friction. Specifically, several rolling members 5 are arranged at intervals along a sliding direction of the sealing member 31. The rolling members 5 are distributed on upper and lower sides of the sealing member 31.

In conjunction with FIGS. 1 to 6, a specific working principle of the child safety seat 100 of this embodiment is described as follows.

When it is necessary to assemble the fitting 6, the sealing member 31 is pushed by the engaging part 61 of the fitting 6 to insert the engaging part 61 into the mounting opening 11, such that the connecting member 2 is disengaged from the accommodating groove 311, and the engaging part 61 is connected to the connecting member 2. During this process, the sealing member 31 compresses the first elastic reset member 32. When it is necessary to disassemble the fitting 6, the engaging part 61 is operated to be disengaged from the connecting member 2 and allowing the engaging part 61 to be out of the mounting opening 11, the sealing member 31 may be slidably reset to the initial position under the action of the elastic recovery force of the first elastic reset member 32 and seal the mounting opening 11.

As mentioned above, the child safety seat 100 of the present disclosure is provided with a sealing mechanism 3, and the sealing member 31 of the sealing mechanism 3 seals the mounting opening 11 on the seat body 1, so that dust in the outside can be prevented from being accumulated in the mounting opening 11, improving the cleanness of appearance of the child safety seat 100; moreover, the hand of a child can be prevented from being mistakenly inserted into the mounting opening 11, improving the safety of the child safety seat 100. In addition, when it is necessary to install the fitting 6, the fitting 6 may push against the sealing member 31 to allow the connecting member 2 to be disengaged from the accommodating groove 311, so that the fitting 6 is connected to the connecting member 2 and thus is installed on the seat body 1.

Second Embodiment

Figure 7:
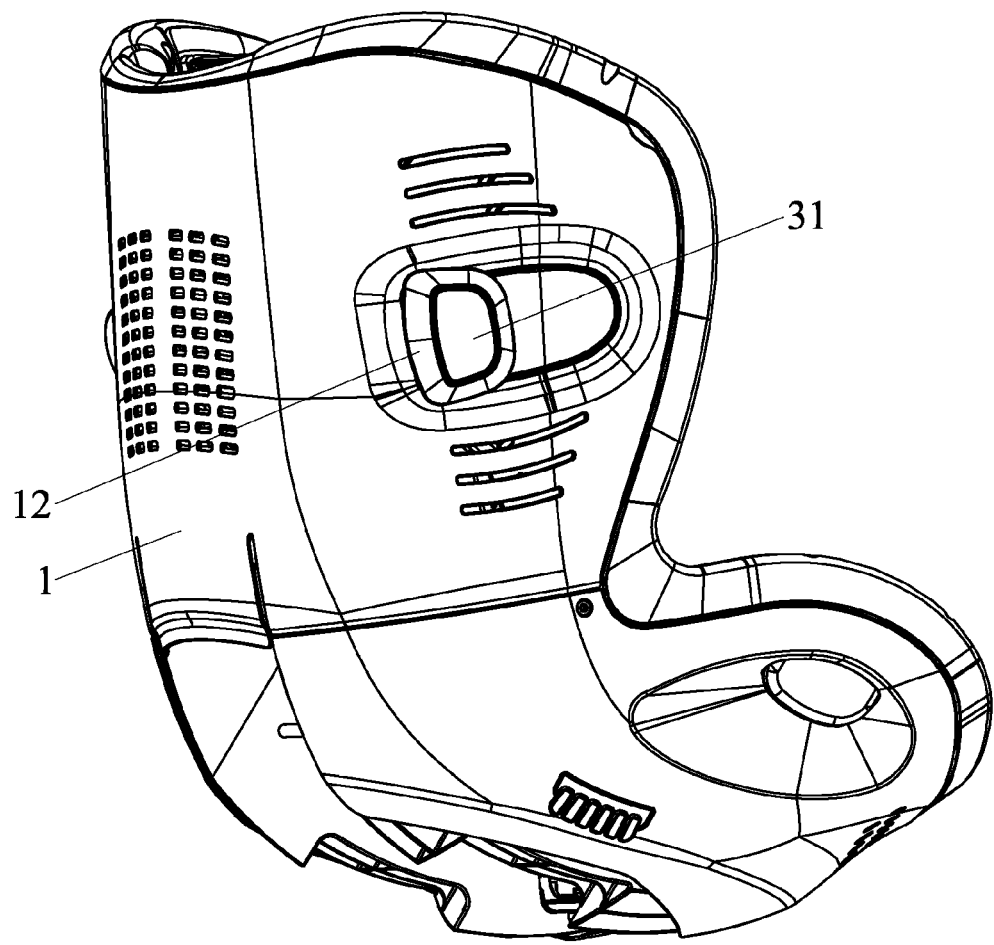
FIG. 7 is a schematic perspective view the child safety seat according to a second embodiment of the present disclosure.
Figure 8:
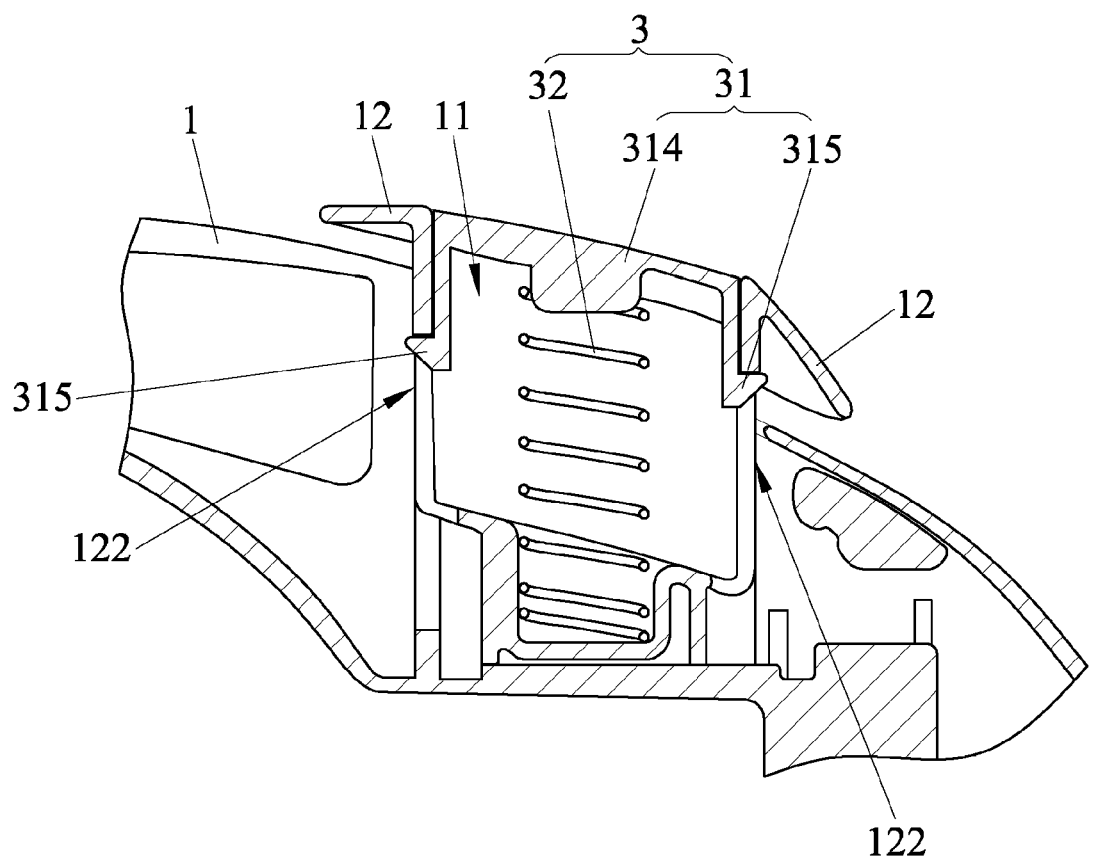
FIG. 8 is a sectional view of the child safety seat at a sealing mechanism according to the second embodiment of the present disclosure.
Figure 9:
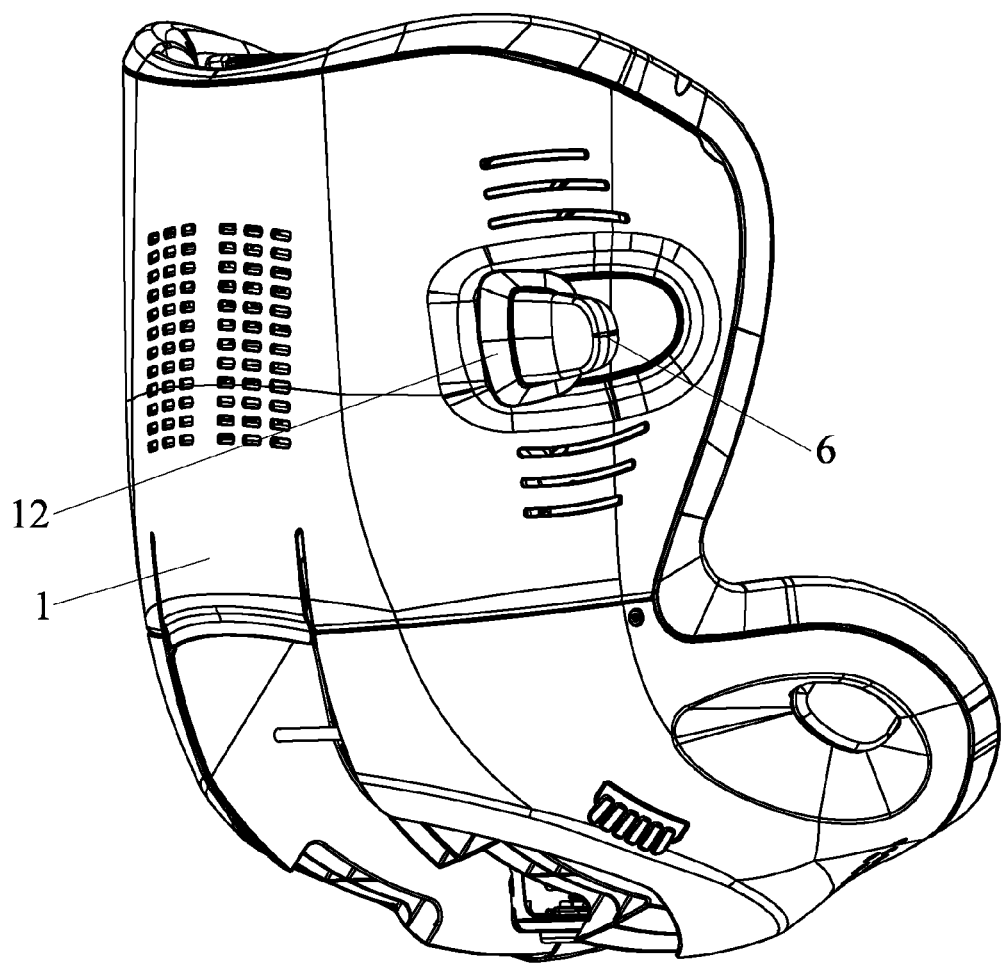
FIG. 9 is a schematic view of the child safety seat after being assembled according to the second embodiment of the present disclosure.

Referring to FIGS. 7 to 9, the child safety seat 100 of the present disclosure includes a seat body 1, a sealing mechanism 3 and a fitting 6. The seat body 1 is provided with a mounting opening 11 for insertion of the fitting 6. The sealing mechanism 3 includes a sealing member 31 that is slidably arranged in the mounting opening 11 for sealing the mounting opening 11. The sealing member 31 is pushed by means of the fitting 6 to be connected to the seat body 1, such that the installation of the fitting 6 is completed. In this embodiment, the seat body 1 has a fixing seat 12. The mounting opening 11 is formed on the fixing seat 12, and the sealing member 31 is pushed by means of the fitting 6 to be clamped onto the fixing seat 12. Specifically, a side wall of the fixing seat 12 is provided with a stopper 122 for clamping the fitting 6, and the fitting 6 may be clamped into the stopper 122, so as to be clamped to the fixing seat 12. Furthermore, the sealing mechanism 3 further includes a first elastic reset member 32 for resetting the sealing member 31, and the first elastic reset member 32 is arranged between the sealing member 31 and the fixing seat 12 of the seat body 1. When the fitting 6 pushes against the sealing member 31, the sealing member 31 compresses the first elastic reset member 32; and when the fitting 6 is disengaged from the seat body 1, the sealing member 31 may slidably reset under the action of the elastic recovery force of the first elastic reset member 32, so as to seal the mounting opening 11.

Referring to FIG. 8, in this embodiment, the sealing member 31 is slidably inserted into the stopper 122. Specifically, the sealing member 31 includes a sealing body 314 and a limiting part 315, the limiting part 315 is connected to a side of the sealing body 314, and the limiting part 315 is inserted into the stopper 122. When the fitting 6 is not installed to the seat body 1, the limiting part 315 is abutted against one end of the stopper 122 to restrain the sealing member 31, so as to avoid the sealing member 31 from being disengaged from the fixing seat 12. Two limiting parts 315 are arranged on both side of the sealing body 314, and inserted into the stoppers 122 on both sides of the fixing seat 12, respectively.

Figure 10:
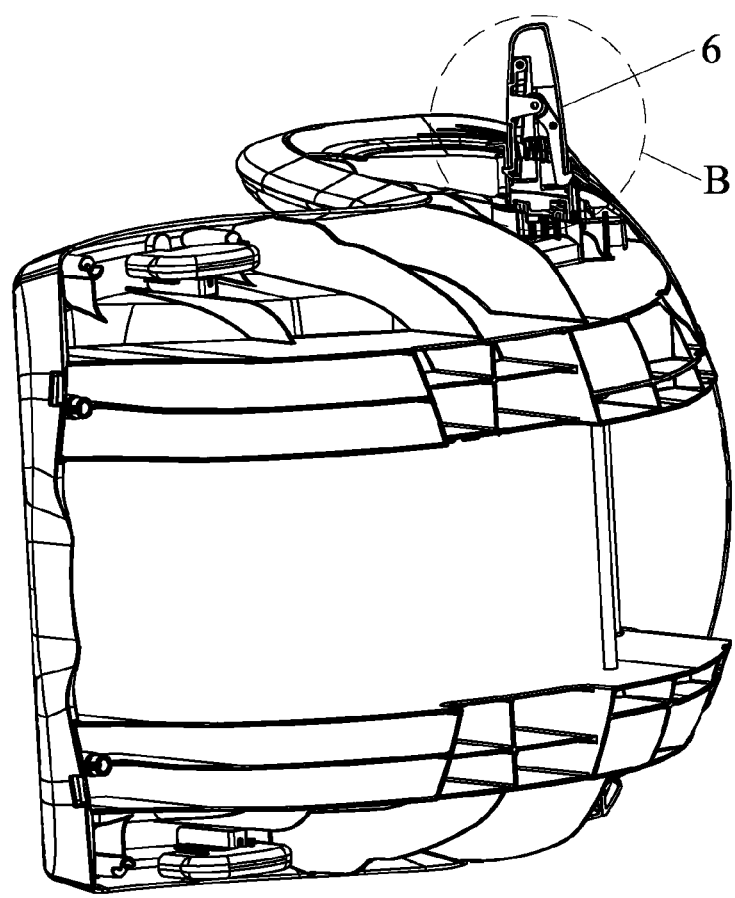
FIG. 10 is a schematic view of an internal structure of the child safety seat according to the second embodiment of the present disclosure.
Figure 11:
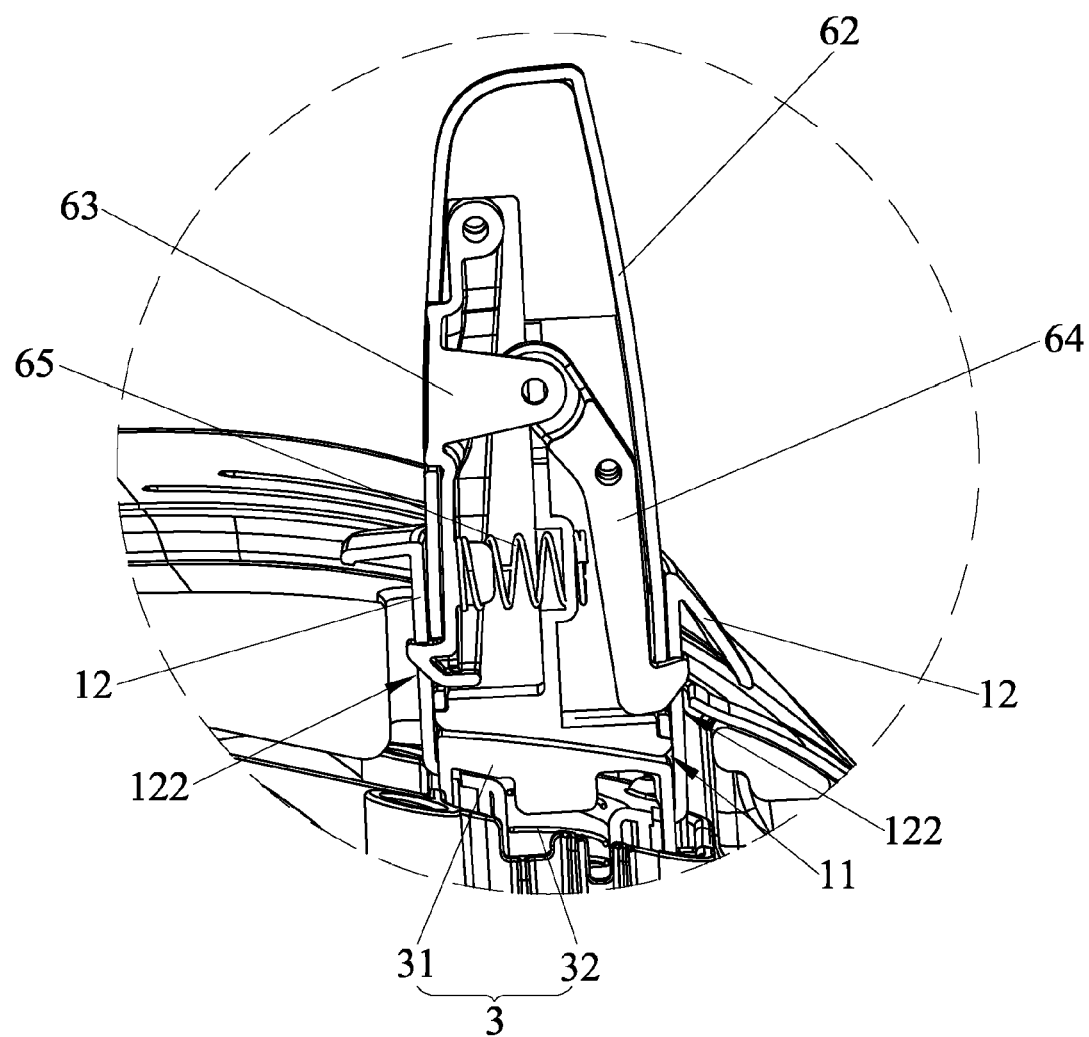
FIG. 11 is an enlarged view of B in FIG. 10.
Figure 12:
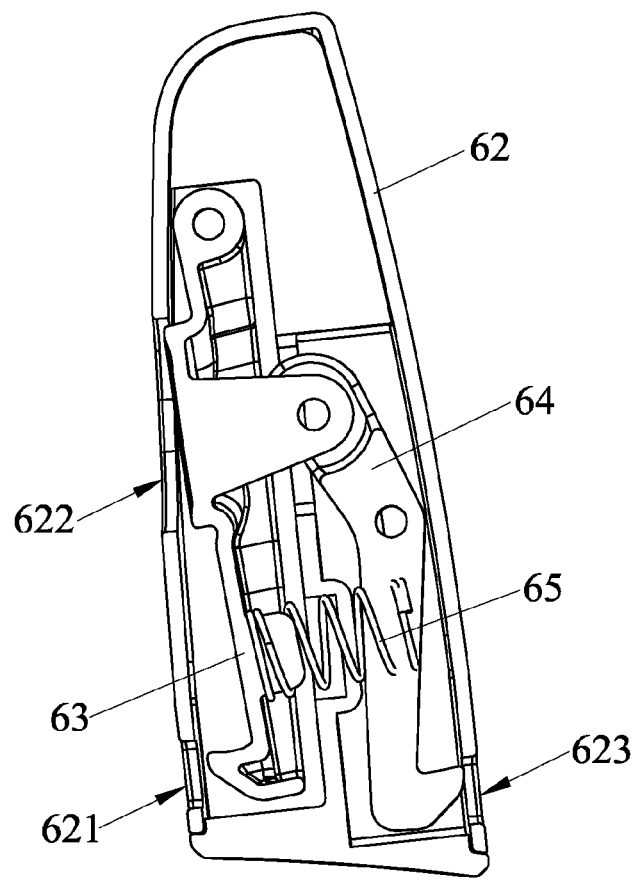
FIG. 12 is a schematic view of an internal structure of a fitting of the child safety seat according to the second embodiment of the present disclosure.

Referring to FIGS. 10 to 12, in this embodiment, the fitting 6 includes a housing 62 and a first engaging member 63. The first engaging member 63 is arranged in the housing 62. One end of the first engaging member 63 is pivotally connected to the housing 62, driving the rotation of the first engaging member 63, and allowing the other end of the first engaging member 63 to protrude out of the housing 62 or be hidden inside the housing 62, such that the first engaging member 63 is engaged with or disengaged from the seat body 1. Specifically, the housing 62 is provided with a first perforation 621 from which the other end of the first engaging member 63 protrudes. The housing 62 is provided with a second perforation 622, and an intermediate part of the first engaging member 63 is inserted into the second perforation 622, facilitating for an operator to drive the rotation of the first engaging member 63 by the intermediate part of the first engaging member 63. Furthermore, the fitting 6 further includes a second elastic reset member 65, which is arranged between the first engaging member 63 and the housing 62 and drives the first engaging member 63 to protrude out of the housing 62. When the operator presses the intermediate part of the first engaging member 63 to drive the rotation of the first engaging member 63, the intermediate part of the first engaging member 63 is disengaged from the second perforation 622 and compresses the second elastic reset member 65, such that the other end of the first engaging member 63 is hidden inside the housing 62; and when the first engaging member 63 is released, the first engaging member 63 is rotatably reset under the action of the second elastic reset member 65, the intermediate part of the first engaging member 63 is re-inserted into the second perforation 622, the other end of the first engaging member 63 passes through the first perforation 621 and protrudes to the outside of the housing 62.

Referring to FIGS. 11 and 12, the fitting 6 further includes a second engaging member 64. The second engaging member 64 is arranged in the housing 62, one end of the second engaging member 64 is pivotally connected to the first engaging member 63, the intermediate part of the second engaging member 64 is pivotally connected to the housing 62, the first engaging member 63 is rotated and drives the rotation of the second engaging member 64, such that the other end of the second engaging member 64 protrudes out of the housing 62 or is hidden inside the housing 62, and the second engaging member 64 is engaged with or disengaged from the fixing seat 12 of the seat body 1. The first engaging member 63 and the second engaging member 64 are engaged to stoppers 122 on both sides of the fixing seat 12 respectively, such that the fitting 6 is stably installed on the seat body 1. Specifically, the housing 62 is provided with a third perforation 623 from which the other end of the second engaging member 64 protrudes. In this embodiment, the fitting 6 is a side impact protective block connected to each side or a side of the seat body 1, but the present disclosure is not limited thereto.

In conjunction with FIGS. 7 to 12, the specific working principle of the child safety seat 100 in this embodiment is described as follows:

When it is necessary to assemble the fitting 6, the intermediate part of the first engaging member 63 is first pressed to drive the rotation of the first engaging member 63, such that the other end of the first engaging member 63 is hidden inside the housing 62 and compresses the second elastic reset member 65, and the rotation of the first engaging member 63 may promote the rotation of the second engaging member 64, such that the other end of the second engaging member 64 is hidden inside the housing 62; the sealing member 31 is then pushed by the fitting 6, such that the sealing member 31 is slidable downwards and compresses the first elastic reset member 32, and then the first engaging member 63 is released, and the first engaging member 63 is rotatably reset under the action of the second elastic reset member 65, such that the first engaging member 63 protrudes out of the housing 62 and is engaged to the stopper 122 of the fixing seat 12, the rotation of the first engaging member 63 can promote the rotation of the second engaging member 64, and the second engaging member 64 protrudes out of the housing 62 and is engaged to the stopper 122 of the fixing seat 12, thereby completing the installation of the fitting 6. When it is necessary to disassemble the fitting 6, the first engaging member 63 is operated to rotate and drives the rotation of the second engaging member 64, such that the first engaging member 63 and the second engaging member 64 are disengaged from the stoppers 122 respectively, so as to disassemble the fitting 6.

As above mentioned, the child safety seat 100 of the present disclosure is provided with a sealing mechanism 3, and the sealing member 31 of the sealing mechanism 3 seals the mounting opening 11 on the seat body 1, so that dust in the outside can be prevented from being accumulated in the mounting opening 11, improving the cleanness of appearance of the child safety seat 100; moreover, the hand of a child can be prevented from being mistakenly inserted into the mounting opening 11, improving the safety of the child safety seat 100. In addition, when it is necessary to assemble the fitting 6, the fitting 6 pushes against the sealing member 31 to be connected to the seat body 1.

The embodiments as disclosed above are only preferred embodiments of the present disclosure, which should not be used to limit the protection scope of the present disclosure. Therefore, all equivalent changes in the claims of the present disclosure fall within the scope of the present disclosure.

What is claimed is:

1. A child safety seat, comprising:
   a seat body provided with a mounting opening for insertion of a fitting,
   a connecting member provided in the mounting opening and fixedly connected to the seat body, and
   a sealing mechanism comprising a sealing member that is slidably provided in the mounting opening for sealing the mounting opening, the sealing member is provided with an accommodating groove having an opening faced outwards and accommodating the connecting member,
   wherein the sealing member is pushed by means of the fitting to enable the connecting member to be disengaged from the accommodating groove, such that the fitting is connected to the connecting member.

2. The child safety seat according to claim 1, further comprising a limiting member, wherein the limiting member is arranged in the mounting opening and fixedly connected to the seat body, the sealing member is provided with a limiting groove, and the limiting member is inserted into the limiting groove.

3. The child safety seat according to claim 1, wherein the sealing mechanism further comprises a first elastic reset member for driving the sealing member, and the first elastic reset member is arranged between the sealing member and the seat body.

4. The child safety seat according to claim 3, wherein the sealing member is provided with a receiving groove, and one end of the first elastic reset member is inserted into the receiving groove.

5. The child safety seat according to claim 3, wherein the seat body is provided with a fixing seat in the mounting opening, the fixing seat is provided with a sliding groove, and the sealing member is slidable along the sliding groove.

6. The child safety seat according to claim 5, wherein the first elastic reset member is arranged in the sliding groove and positioned between the sealing member and the fixing seat.

7. The child safety seat according to claim 1, further comprising a rolling member that is pivotally connected to the seat body and arranged between an inner wall of the mounting opening and the sealing member.

8. The child safety seat according to claim 7, wherein several rolling members are arranged at intervals along a sliding direction of the sealing member.

9. The child safety seat according to claim 1, wherein the fitting is a front shield.

10. The child safety seat according to claim 1, wherein the fitting is provided with an engaging part that is insertable into the mounting opening and is removably connected to the connecting member.

11. A child safety seat, comprising:
    a seat body provided with a mounting opening for insertion of a fitting, and
    a sealing mechanism comprising a sealing member that is slidably arranged in the mounting opening for sealing the mounting opening, the sealing member being provided with a limiting groove, and
    a limiting member arranged in the mounting opening and fixedly connected to the seat body, the limiting member being inserted into the limiting groove,
    wherein the sealing member is pushed by the fitting to be connected to the seat body, and the limiting member slides within the limiting groove as the fitting pushes the sealing member.

\* \* \* \* \*